US011887419B2

(12) United States Patent
Everson et al.

(10) Patent No.: US 11,887,419 B2
(45) Date of Patent: Jan. 30, 2024

(54) SOLAR POWERED ACCESS CONTROL DEVICES

(71) Applicant: Schlage Lock Company LLC, Carmel, IN (US)

(72) Inventors: Jonathan Everson, Kokomo, IN (US); Robert Gaulden, Haymarket, VA (US); Kevin P. Oehler, Fishers, IN (US); John D. Goodwin, Carmel, IN (US); Joseph Charles Erario, Boulder, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 17/658,938

(22) Filed: Apr. 12, 2022

(65) Prior Publication Data

US 2023/0145570 A1 May 11, 2023

Related U.S. Application Data

(60) Provisional application No. 63/263,918, filed on Nov. 11, 2021.

(51) Int. Cl.
*G07C 9/00* (2020.01)

(52) U.S. Cl.
CPC . *G07C 9/00309* (2013.01); *G07C 2009/0065* (2013.01); *G07C 2009/00642* (2013.01)

(58) Field of Classification Search
None
See application file for complete search history.

(56) References Cited

U.S. PATENT DOCUMENTS 3,939,391 A * 2/1976 Winnacker .............. H02J 50/10 320/108
4,935,742 A * 6/1990 Marin ....................... G01S 7/02 342/13
9,650,808 B2 5/2017 Martel et al.
10,789,797 B2 9/2020 Hopkins et al.
2005/0219359 A1* 10/2005 Trela ........................ H04N 7/18 348/156
2011/0241889 A1* 10/2011 Fromme ................ G01N 27/00 702/24
2013/0000366 A1* 1/2013 Martel .................... E05B 47/00 70/280
2015/0001944 A1* 1/2015 Markowz ................. H02J 11/00 307/66
2023/0145570 A1* 5/2023 Everson ............. G07C 9/00309 340/5.6
2023/0148224 A1* 5/2023 Henriksen ............ H04R 1/1025 381/323

* cited by examiner

*Primary Examiner* — Carlos Garcia
(74) *Attorney, Agent, or Firm* — Taft Stettinius & Hollister LLP

(57) ABSTRACT

Access control devices are provided that include locking mechanisms, reader devices, and control units powered by solar devices.

20 Claims, 5 Drawing Sheets

SOLAR POWERED ACCESS CONTROL DEVICES

The present application claims the benefit of the filing date of U.S. Provisional Application Ser. No. 63/263,918 filed on Nov. 11, 2021, which is incorporated herein by reference.

BACKGROUND

Some locations remote from building enclosures and/or ready access to line power could benefit from having access control systems to provide controlled access for security and safety. For example, swimming pools are often enclosed by fencing to prevent unauthorized usage and for safety. Access to the fenced area is controlled by a gate or other entry device. It is beneficial that the entry device be locked. Since the location of the entry device may be remote from a power supply, any lock that is used is typically a manual lock. Providing and revoking access privileges is therefore cumbersome and inefficient since physical keys or numerical combinations are required to be issued to potential users. Therefore, further improvements in this area are needed.

SUMMARY

According to one embodiment, an access control device includes an electronic locking mechanism, a reader device for reading access credentials to actuate the locking mechanism, and a control unit connected to the reader device for controlling actuation of the locking mechanism. The control unit is powered by a rechargeable battery. A solar device is connected to the rechargeable battery for receiving solar power to charge the rechargeable battery for powering the control unit, and powering the reader device and locking mechanism through the control unit.

According to another embodiment, an access control system includes a plurality of access control devices that each include an electronic locking mechanism, a credential reader device, and a control unit for controlling actuation of the locking mechanism in response to credentials read by the reader device. At least one of the access control devices includes a control unit powered by a battery that is recharged by solar power, and at least one of other of the access control devices includes a control unit powered by line power.

In an embodiment, the solar device includes a solar charge controller that is connected between a photovoltaic panel/array and the rechargeable battery. In an embodiment, the charge controller, the battery, and the control unit are located in a waterproof enclosure. In an embodiment, the charge controller and the battery are located in one waterproof enclosure, and the control unit is located in another waterproof enclosure. In an embodiment, the enclosure(s) are NEMA (National Electrical Manufacturers Association) rated enclosures.

In an embodiment, the rechargeable battery is a lithium-ion battery. In an embodiment, the rechargeable battery is a lithium iron phosphate battery. In an embodiment, the rechargeable battery is a 12 volt rechargeable battery. In an embodiment, the rechargeable battery is a 24 volt rechargeable battery.

In an embodiment, the solar device is at least one photovoltaic solar panel. In an embodiment, the solar device is a photovoltaic solar array. In an embodiment, the access control system is used in conjunction with an access portal that is located outdoors and controls access to an outdoor space. In an embodiment, the access portal is a gate for an enclosed outdoor area. In an embodiment, the enclosed outdoor area includes a swimming pool.

In an embodiment, a user's credentials can be used to open both a line powered access control device and a solar powered access control device. In an embodiment, the solar powered access control device can be updated with user credentials without the solar powered access control device being connected to a network or accessed by a credential manager.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
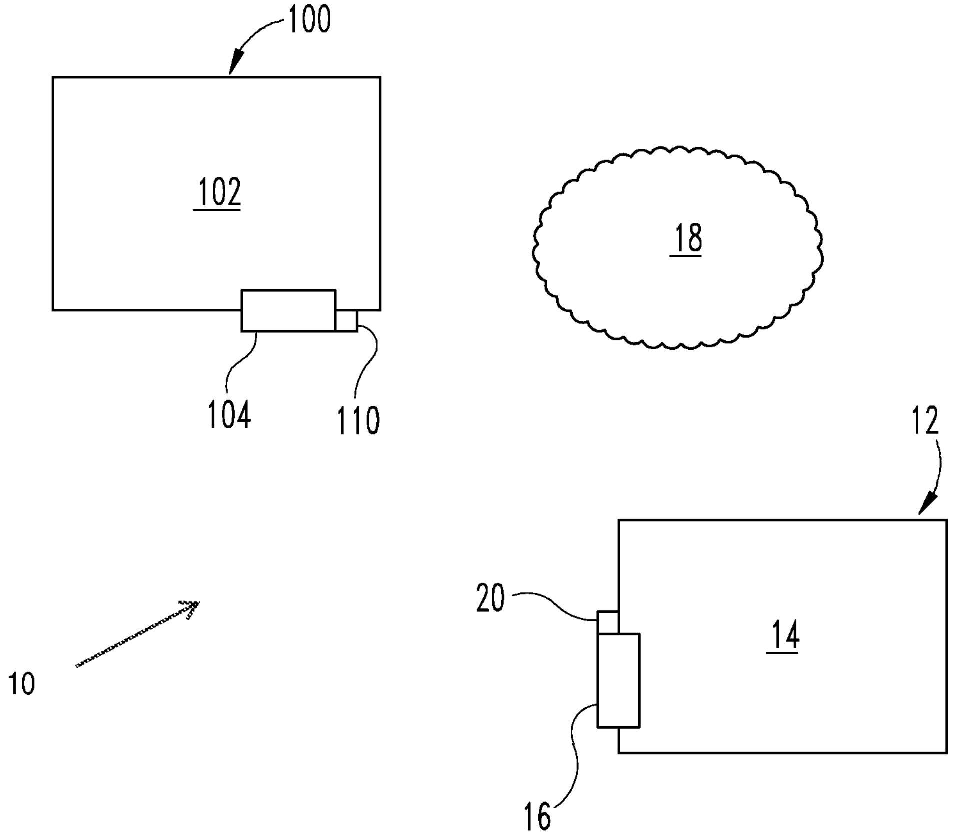
FIG. 1 is a simplified block diagram of at least one embodiment of an access control system including indoor and outdoor portals for access to secured areas.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring to FIG. 1, in the illustrative embodiment, an access control system 10 includes one or more first enclosures 12 with a first space 14 that can be accessed by at least one first access portal 16, and one or more second enclosures 100 with a second space 102 that can be accessed by at least one second access portal 104. First access portal 16 includes a first access control device 20 that can be electronically locked and unlocked by one or more credentialed users, and second access portal 104 can include a second access control device 110 that is solar powered and that can be electronically locked and unlocked by one or more credentialed users. It should be appreciated that one or more of the features of the access control system 10 may be omitted in some embodiments, or that one or more of the features can be duplicated.

In an embodiment, at least part of first space 14 is an indoor space enclosed by a first enclosure 12 that is a building or other structure with walls and a roof. First access portal 16 can be, for example, a door leading to an interior of a building, or a door located within an interior of the building. First access portal 16 can provide access to a common area of the first enclosure 12, or to a more restricted area of first enclosure 12, such as a rental unit, dwelling, or office, via the first access control device 20 at the first access portal 16. While one first access portal 16 is shown in FIG. 1, it is contemplated multiple first access portals 16 are contemplated as part of the access control system 10 with each including a first access control device 20 having line power. One or more of the first access portal(s) 16 can also be connected to a communication network 18 associated with the first space 14.

In an embodiment, at least part of the second space 102 is an outdoor space enclosed by a second enclosure 100 that is a fence or other barrier. Second access portal 106 can be, for example, a gate leading to a fenced-in second space 102, or a door to a shed or other building forming second enclosure 100 at a location remote from first enclosure 12 such that providing line power to second access portal 106 is costly or impractical. Second access portal 106 can provide access to a pool or other facility in the second space 102 that is protected by the second access control device 110. While one second enclosure 100 and second access portal 106 are shown, it is contemplated multiple second enclosures 100 and/or multiple second access portals 106 can be part of the access control system 10. As discussed further below, it is not necessary for one or more of the second access portal(s) 106 to be connected to communication network 18. Furthermore, systems in which only solar-powered access control device(s) 110 are provided are also contemplated.

It should be appreciated that, in some embodiments, the illustrative access control system 10 allows for flexible access to and/or control over the first space 14 and/or the second space 102. For example, in some embodiments, the owner of system 10 may invite others to have access to the one or more secure areas in the first space 14 and/or in the second space 102 without the owner or user being present at second space 102 or having a real-time connection to the second access control device 110. To do so, the access control system 10 may utilize connectivity to a communication network 18 such as a cloud server that distributes access tokens or credentials to one or more users via an encoded key card or via an application or token on a mobile device such as a smartphone for subsequent use with a specific access control device 20, 110.

It should be further appreciated that, in some embodiments, the access control list of authorized users of the access control devices 20, 110 may be stored on the cloud server such that the first access control device 20 and/or second access control device 110 is not required to locally store an access control list. For example, access control device 110 can be out of range of WiFi or other wireless communications network. Access control device 110 can be updated via a physical credential or mobile application to deliver credential access rights without touring access control device 10. Examples of such "no tour" capabilities are provided in U.S. patent application Ser. No. 16/578,747 filed Sep. 23, 2019, which is incorporated herein by reference. However, local storage of access control lists and/or touring of the access control devices 20, 110 to update credentials is not prohibited by the current disclosure.

Communication network 18 may be any suitable wireless communication connection (e.g., Bluetooth, Wi-Fi, etc.) established between one or more devices and/or users of the system 10. Additionally, in various embodiments, communications can occur with a cloud server over Wi-Fi, WiMAX, a WAN (e.g., the Internet), and/or a suitable telecommunications network/protocol. As such, it should be appreciated that the illustrative communication network 18 is located at one or more remote locations relative to the users and/or access control devices 20, 110. In other embodiments, it should be appreciated that one or more of the communication connections may be wired. In addition, although not shown, communications with local servers and/or a gateway device in conjunction with third-party integrations with the access control system 10 are also contemplated.

It should be appreciated that each of the access control devices 20, 110 and other servers and gateway devices used with access control system 10 may be embodied as a computing device similar to the computing device 200 described below in reference to FIG. 2. For example, in the illustrative embodiment, access control devices 20, 110 may each include a processing device 202 and a memory 206 having stored thereon operating logic 208 for execution by the processing device 202 for operation of the corresponding device.

Figure 2:
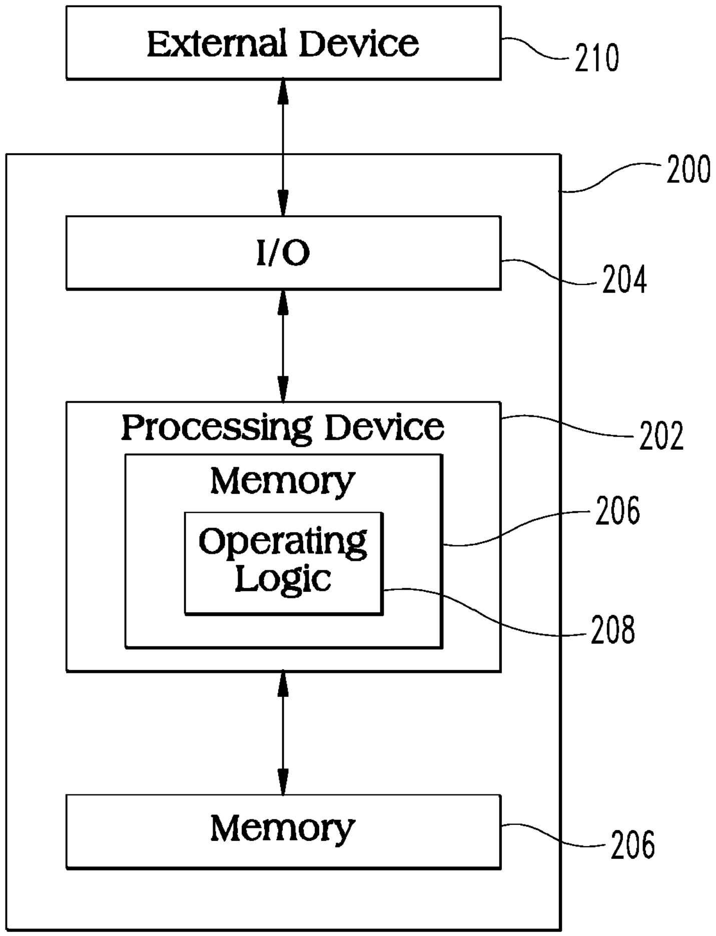
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device that may be utilized in connection with the access control system 10 illustrated in FIG. 1. Depending on the particular embodiment, the computing device 200 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to affect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the first access control device 20 and/or the second access control device 110. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices.

Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
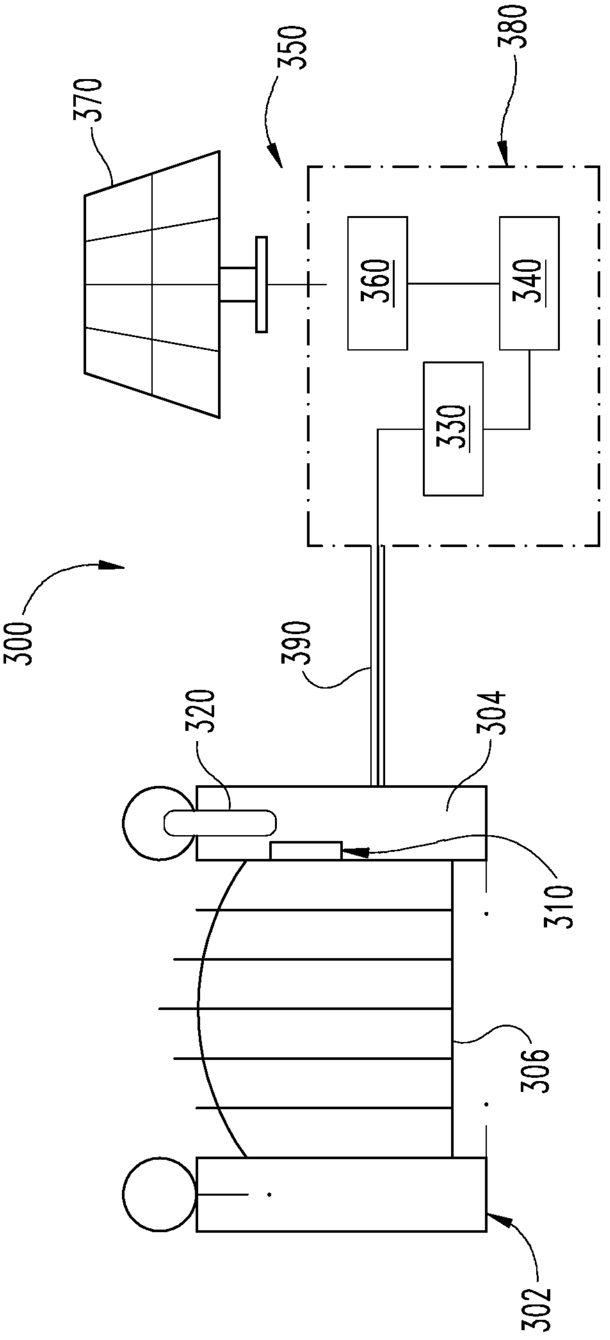
FIG. 3 is a simplified schematic of an access portal with an embodiment of a solar powered access control device.

Referring to FIG. 3, an embodiment of the solar powered second access control device 110 is shown as designated as an access control device 300. Access control device 300 is used in conjunction with a second access portal 106 that is a gate 302. Gate 302 includes a frame 304 and a movable barrier 306 mounted to frame 304. Access control device 300 includes a locking mechanism 310 that is secured to frame 304 and movable barrier 306 to provide electronic locking capabilities and controlled access via gate 302. In an embodiment, locking mechanism 310 is an electric strike type locking mechanism. However, any suitable locking mechanism for an outdoor or remote access portal is contemplated, so long as it can be electronically actuated and controlled by electronic user credentials.

Figure 4:
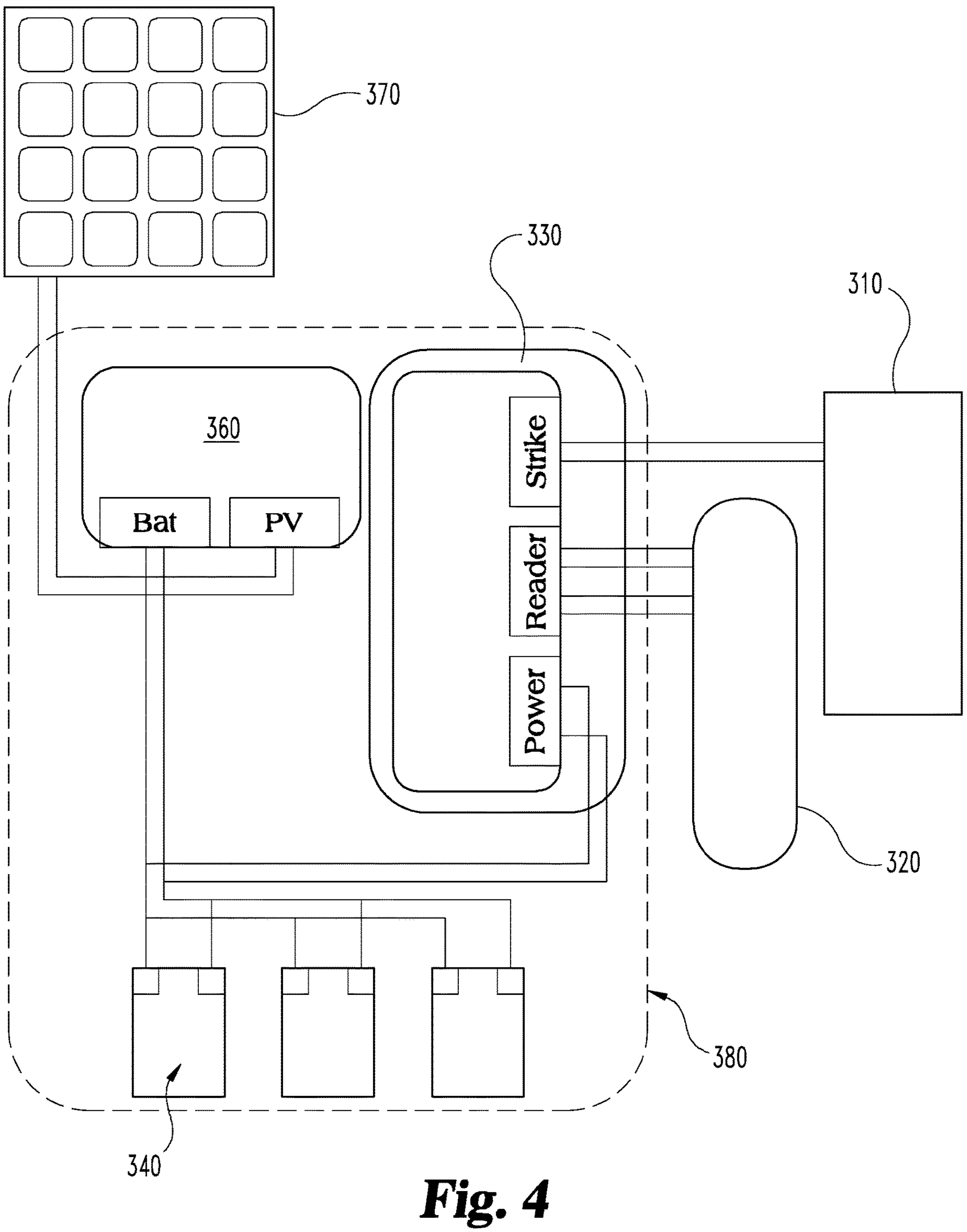
FIG. 4 is a simplified schematic of an embodiment of a solar powered access control device.

Referring further to FIG. 4, access control device 300 further includes a credential reader 320 mounted to frame 304, or otherwise at a suitable location relative to gate 302. Credential reader 320 can be any suitable reader to read and verify credentials from an access key card, mobile device, token other user carried electronic key using Bluetooth, Near Field Communication, smart credentials, and/or standard proximity credentials. In an embodiment, credential read 320 is an MTB mobile enabled multi-technology reader from Schlage®.

Reader 320 is connected to a control unit 330 that includes power outputs to the locking mechanism 310 and to the reader 320. Control unit 330 also includes communications connected to the reader 320 so that locking mechanism 310 can be controlled to be unlocked in response to authorized credentials being read at reader 320. In an embodiment, control unit 330 is a Schlage® CTE single door controller. In an embodiment, control unit 330 may be used to operate multiple access control devices, such as multiple locks associated with different parts of the outdoor area, such as a gate(s), a pool house door, pool cover, storage device door, etc. Other controller types are contemplated.

Control unit 330 receives power from a rechargeable battery 340. Rechargeable battery 340 is connected to a solar device 350 that is operable to recharge the battery 340 using solar power. Solar device 350 includes a charging controller 360 and at least one solar cell 370 for converting solar energy to electrical energy.

Solar cell 370 can include, for example, at least photovoltaic panel or array of panels. In an embodiment, solar cell 370 is rated at a wattage between about 20 watts and 110 watts. In an embodiment, solar cell 370 is rated at a wattage between about 50 watts and 110 watts. In an embodiment, battery 340 is a 12 volt battery. In an embodiment, battery 340 is a 24 volt battery. In an embodiment, battery 340 is a lithium-ion battery. In an embodiment, battery 340 is a lithium iron phosphate battery. Battery 340 may include a single battery, or may include a bank of batteries each connected to charging controller 360 as shown in FIG. 4.

Since access control device 300 is employed in an outdoor environment, an enclosure 380 may be provided to house control unit 330, battery 340, and charge controller 360. In an embodiment, the enclosure 380 is a NEMA rated enclosure. In an embodiment, a conduit 390 is provided for the wires that connect control unit 330 with the reader 320 and/or locking mechanism 310.

Figure 5:
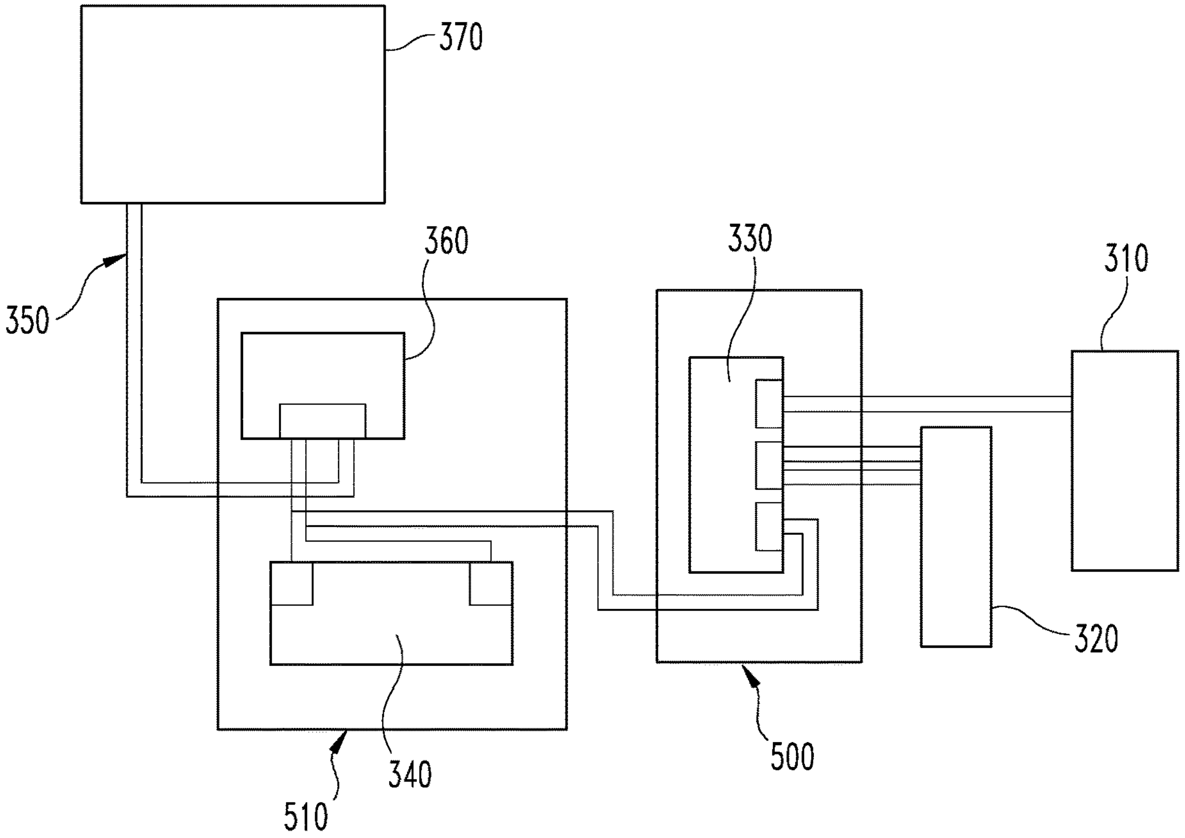
FIG. 5 is a simplified schematic of an embodiment of a solar powered access control device.

In another embodiment, separate enclosures are provided for various parts of access control device 300. For example, as shown in FIG. 5, a first enclosure 500 is provided for control unit 330, and a second enclosure 510 is provided for battery 340 and charge controller 360.

Various aspects of the present disclosure are contemplated. According to one aspect, an access control device includes an electronic locking mechanism for securing an access portal and a reader device for reading access credentials that authorize actuation of the locking mechanism. The access control device further includes a control unit connected to the reader device for controlling actuation of the locking mechanism in response to the access credentials and a rechargeable battery for powering the control unit, the reader device, and the electronic locking mechanism. A solar device is connected to the rechargeable battery for receiving solar power to charge the rechargeable battery.

In an embodiment, the solar device includes a solar charge controller that is connected between a photovoltaic panel/array and the rechargeable battery. In an embodiment, the charge controller, the battery, and the control unit are located in a waterproof enclosure. In an embodiment, the charge controller and the battery are located in a first waterproof enclosure, and the control unit is located in a second waterproof enclosure. In an embodiment, each of the first and second waterproof enclosures are NEMA rated enclosures.

In another embodiment, the rechargeable battery is a lithium-ion battery. In an embodiment, the rechargeable battery is a lithium iron phosphate battery. In an embodiment, the rechargeable battery is a 12 volt rechargeable battery. In an embodiment, the rechargeable battery is a 24 volt rechargeable battery.

In another embodiment, the solar device includes at least one photovoltaic solar panel. In an embodiment, the at least one photovoltaic solar panel is rated for about 20-110 watts. In an embodiment, the at least one photovoltaic solar panel is rated for about 50-110 watts.

According to another aspect of the present disclosure, an access control system includes a plurality of access control devices. Each of the access control devices includes an electronic locking mechanism, a credential reader device, and a control unit for controlling actuation of the locking mechanism in response to credentials read by the reader device. A first one of the access control devices is powered by a battery that is recharged by solar power, and a second one of the access control devices is powered by line power.

In an embodiment, the locking mechanism and the reader device of the first one of the access control devices are mounted at an access portal that is located outdoors remote from the second one of the access control devices. In an embodiment, the access portal is a gate for an outdoor enclosed area. In an embodiment, the enclosed area includes a swimming pool or other gated outdoor area.

In an embodiment, the locking mechanisms of the first one and the second one of the access control devices are actuated by a same credential when read by the credential reader device thereof.

In an embodiment, the access control system includes a communication network and the first one of the access control devices is not connectable to the communication network and the second one of the access control devices is connected to the communication network.

In an embodiment, the first one of the access control devices includes a solar charge controller that is connected between a photovoltaic panel/array and the battery. In an embodiment, the first one of the access control devices includes a waterproof enclosure housing the solar charge controller, the battery, and the control unit. In an embodiment, the first one of the access control devices includes a first waterproof enclosure housing the charge controller and the battery, and a second waterproof enclosure housing the control unit.

What is claimed is:

1. An access control device, comprising:

an electronic locking mechanism for securing an access portal;

a reader device mounted on a frame of the access portal for reading access credentials that authorize actuation of the electronic locking mechanism;

a first waterproof enclosure and a control unit housed in the first waterproof enclosure, the control unit connected to the reader device and to the electronic locking mechanism, the control unit operable to control actuation of the electronic locking mechanism in response to the access credentials being read by the reader device;

a second waterproof enclosure and a rechargeable battery housed in the second waterproof enclosure, the rechargeable battery connected to the control unit and operable to power the control unit, the reader device, and the electronic locking mechanism; and a solar device connected to the rechargeable battery in the second waterproof enclosure, the solar device operable to receive solar power to charge the rechargeable battery.

2. The access control device according to claim 1, wherein the solar device includes a solar charge controller that is connected between a photovoltaic panel/array and the rechargeable battery.

3. The access control device according to claim 2, wherein the solar charge controller and the rechargeable battery are located in the second waterproof enclosure.

4. The access control device according to claim 3, wherein each of the first and second waterproof enclosures are NEMA rated enclosures.

5. The access control device according to claim 1, wherein the solar device includes at least one photovoltaic solar panel.

6. The access control device according to claim 5, wherein the at least one photovoltaic solar panel is rated for about 50-110 watts.

7. The access control device according to claim 1, wherein the rechargeable battery is a lithium-ion battery.

8. The access control device according to claim 1, wherein the rechargeable battery is a lithium iron phosphate battery.

9. The access control device according to claim 1, wherein the rechargeable battery is a 12 volt rechargeable battery.

10. The access control device according to claim 1, wherein the rechargeable battery is a 24 volt rechargeable battery.

11. The access control device according to claim 1, further comprising a conduit extending from the first waterproof enclosure to the credential reader device, the conduit enclosing wires that connect the control unit to the credential reader device and the electronic locking mechanism.

12. An access control system, comprising:

a communication network;

a plurality of access control devices, each of the plurality of access control devices including an electronic locking mechanism, a credential reader device, and a control unit for controlling actuation of the electronic locking mechanism in response to credentials being read by the reader device; and wherein:

a first one of the access control devices is powered by a battery that is recharged by solar power, the electronic locking mechanism and the credential reader device of the first one of the access control devices are mounted at an outdoor access portal that provides access to an outdoor space;

a second one of the access control devices is powered by line power, the electronic locking mechanism and the reader device of the second one of the access control devices are mounted at an access portal that provides access to an indoor space;

the first one of the access control devices is remote from the second one of the access control devices;

the first one of the access control devices is not connected or connectable to the communication network; and the second one of the access control devices is connected to the communication network.

13. The access control system according to claim 12, wherein the outdoor access portal is a gate for an outdoor enclosed area.

14. The access control system according to claim 13, wherein the outdoor enclosed area includes a swimming pool.

15. The access control system according to claim 12, wherein the first one of the access control devices includes a solar charge controller that is connected between a photovoltaic panel/array and the battery.

16. The access control system according to claim 15, wherein the first one of the access control devices includes a waterproof enclosure housing the solar charge controller, the battery, and the control unit.

17. The access control system according to claim 15, wherein the first one of the access control devices includes a first waterproof enclosure housing the solar charge controller and the battery, and a second waterproof enclosure housing the control unit, wherein the control unit is connected to the credential reader device and to the electronic locking mechanism, and the control unit is operable to control actuation of the electronic locking mechanism in response to the access credentials being read by the credential reader device, and the battery is connected to the control unit and operable to power the control unit, the credential reader device, and the electronic locking mechanism.

18. The access control system according to claim 12, wherein the electronic locking mechanisms of the first one and the second one of the access control devices are actuated by a same credential when read by the credential reader device.

19. The access control system according to claim 12, wherein a credential for actuating the first one of the access control devices when read by the credential reader device is delivered to a user via the communication network.

20. The access control system according to claim 12, wherein the control unit of the first one of the access control devices controls actuation of the electronic locking mechanisms of multiple access control devices in response to credentials being read by the credential reader devices.

* * * * *